US012716566B2

(12) United States Patent
Taleb et al.

(10) Patent No.: US 12,716,566 B2
(45) Date of Patent: Aug. 25, 2026

(54) LIGHTING DEVICE FOR PROJECTING AN IMAGE ONTO THE GROUND AROUND A VEHICLE

(71) Applicant: VALEO VISION, Bobigny (FR)

(72) Inventors: Rabih Taleb, Bobigny (FR); Sidahmed Beddar, Bobigny (FR); Remi Letoumelin, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 19/108,836

(22) PCT Filed: Sep. 7, 2023

(86) PCT No.: PCT/EP2023/074686
§ 371 (c)(1),
(2) Date: Mar. 5, 2025

(87) PCT Pub. No.: WO2024/052510
PCT Pub. Date: Mar. 14, 2024

(65) Prior Publication Data

US 2026/0085808 A1 Mar. 26, 2026

(30) Foreign Application Priority Data

Sep. 7, 2022 (FR) ...................................... 2208931

(51) Int. Cl.
*F21S 43/00* (2018.01)
*B60Q 1/26* (2006.01)
(Continued)

(52) U.S. Cl.
CPC .......... *F21S 43/601* (2024.05); *B60Q 1/2665* (2013.01); *B60Q 1/543* (2022.05);
(Continued)

(58) Field of Classification Search
CPC .. B60Q 2400/50; B60Q 1/543; B60Q 1/2665; F21S 43/601; F21S 10/007; F21S 10/026; G03B 21/64; F21W 2103/60
See application file for complete search history.

(56) References Cited

U.S. PATENT DOCUMENTS 5,739,604 A * 4/1998 Summerland ......... F21S 10/007
310/80
5,934,794 A * 8/1999 Hutton .................. F21S 10/007
362/323

(Continued)

FOREIGN PATENT DOCUMENTS

JP 2015221659 A 12/2015

OTHER PUBLICATIONS

European Patent Office, International Search Report (with English translation) and Written Opinion of 27corresponding PCT Application No. PCT/EP2023/074686 dated Nov. 27, 2023.

*Primary Examiner* — Zheng Song
*Assistant Examiner* — James M Endo
(74) *Attorney, Agent, or Firm* — Valeo Vision

(57) ABSTRACT

A lighting device for projecting an image onto the ground around a motor vehicle. The lighting device includes a light source capable of producing a light beam, a first mask with a first pattern and a second pattern, the first mask being movable between a first position and a second position, a second mask with a third pattern and a fourth pattern, the second mask being movable between a first position and a second position, an actuator configured to move the first mask between its first position and its second position, and a drive means configured to optionally move the second mask between its first position and its second position at the same time as the first mask.

8 Claims, 9 Drawing Sheets

(51) Int. Cl.

| | |
|---|---|
| ***B60Q 1/50*** | (2006.01) |
| ***F21S 43/20*** | (2018.01) |
| ***F21W 103/60*** | (2018.01) |

(52) U.S. Cl.

CPC ........ *F21S 43/255* (2018.01); *B60Q 2400/50* (2013.01); *F21W 2103/60* (2018.01)

(56) References Cited

U.S. PATENT DOCUMENTS

| | | | | |
|---|---|---|---|---|
| 10,302,922 | B2 | 5/2019 | McClelland et al. | |
| 10,429,561 | B2 | 10/2019 | Chen | |
| 10,738,960 | B1 * | 8/2020 | Hellin Navarro | F21V 17/002 |
| 11,112,078 | B2 | 9/2021 | Jiang | |
| 11,549,660 | B2 | 1/2023 | Liu et al. | |
| 2005/0094291 | A1 * | 5/2005 | Onishi | G03B 21/005 348/E5.143 |
| 2006/0187654 | A1 * | 8/2006 | Jungel-Schmid | F21V 17/02 362/147 |
| 2014/0191859 | A1 * | 7/2014 | Koelsch | H02J 7/0048 340/455 |
| 2016/0290597 | A1 * | 10/2016 | Jurik | G02B 19/0066 |
| 2018/0170244 | A1 * | 6/2018 | Chen | G02B 3/0062 |
| 2020/0088379 | A1 * | 3/2020 | Kurashige | G02B 5/32 |
| 2023/0358381 | A1 * | 11/2023 | Lee | F21S 41/686 |

* cited by examiner

LIGHTING DEVICE FOR PROJECTING AN IMAGE ONTO THE GROUND AROUND A VEHICLE

TECHNICAL FIELD

The invention relates to a luminous device for an automotive vehicle, the luminous device being configured to project an image such as a pictogram onto the ground

BACKGROUND OF THE INVENTION

Some automotive vehicles are equipped with a luminous device configured to project an image onto the ground around the vehicle. These luminous devices comprise a light source and a mask, or slide, locally illuminated by the light source in a lighting zone. The mask comprises a plurality of patterns arranged on its surface and is movable between as many positions as it has patterns. For each position of the mask, a different pattern is present in the lighting zone, such that a different image can be projected onto the ground. The images thus obtained may include pictograms intended to provide useful information to a user. For example, when the vehicle is a plug-in electric or hybrid vehicle, the image projected onto the ground can provide an indication of the state of charge of a battery of the vehicle. A pictogram representing the state of charge of a battery may conventionally include the schematic depiction of a battery cell with various stages, these stages being depicted full or empty depending on the state of charge.

In order to transmit a wide range of information to the users of the vehicle, it is sought to increase the number of patterns present on the mask. However, this requires the use of a mask of a large size. The space taken up by the luminous device is thus increased and becomes incompatible with integration in locations on the vehicle where the space available is small, such as at an exterior rear-view mirror or at a door sill of the vehicle. Alternatively, in order to increase the number of patterns present on the mask, the dimensions of each of these patterns can be reduced. However, reducing the dimensions of the patterns on the mask results in the projection of images that are too small and/or blurred.

SUMMARY OF THE INVENTION

The aim of the invention is to provide a luminous device and a method for using such a luminous device that remedy the above drawbacks and improve the luminous devices known from the prior art and their methods for use.

More specifically, a first subject of the invention is a luminous device which is both compact and allows a wide variety of images to be projected onto the ground.

The invention relates to a luminous device for projecting an image onto the ground around an automotive vehicle, the luminous device comprising a casing housing at least:

- a light source capable of producing a light beam,
- a first mask comprising a first pattern and at least one second pattern, the first mask being movable between a first position and at least a second position, the first pattern being positioned through the light beam when the first mask is in its first position, the second pattern being positioned through the light beam when the first mask is in its second position,
- a second mask comprising a third pattern and at least one fourth pattern, the second mask being movable between a first position and at least a second position, the third pattern being positioned through the light beam when the second mask is in its first position, the fourth pattern being positioned through the light beam when the second mask is in its second position,
- an actuator configured to move the first mask between its first position and at least its second position, and
- a drive means configured to optionally move the second mask between its first position and at least its second position at the same time as the first mask.

The first mask and the second mask may be movable in rotation about the same axis.

The first mask may have a generally circular shape, the patterns of the first mask being distributed around a center of the first mask. The second mask may have a generally circular shape, the patterns of the second mask being distributed around a center of the second mask.

The first mask may extend in a first plane and the second mask may extend in a second plane, the second plane being parallel to the first plane and offset from the first plane.

The first pattern may comprise at least one opaque zone and at least one transparent zone. The second pattern may comprise at least one opaque zone and at least one transparent zone.

The third pattern and/or the fourth pattern may comprise at least one opaque zone having a shape substantially homothetic to the shape of the at least one transparent zone of the first pattern and/or of the second pattern, the opaque zone of the third pattern and/or of the fourth pattern being capable of extending face-to-face with the at least one transparent zone of the first pattern and/or of the second pattern.

The first pattern and/or the second pattern may comprise at least one opaque zone, a first transparent zone and at least one second transparent zone, the second transparent zone being separated from the first transparent zone by the opaque zone of the first mask, the third pattern and/or the fourth pattern comprising a transparent zone and an opaque zone, the transparent zone of the third pattern and/or of the fourth pattern being able to extend face-to-face with the first transparent zone of the first pattern and/or of the second pattern, and the opaque zone of the third pattern and/or of the fourth pattern being able to extend face-to-face with the second transparent zone of the first pattern and/or of the second pattern.

The drive means may comprise a first stop secured to the first mask, the first stop cooperating with a second stop secured to the second mask, in such a way that the movement of the first mask causes the second mask to move when the first stop is in abutment against the second stop.

The drive means may comprise electromagnetic means configured to optionally secure the second mask to the first mask and/or to an element of the actuator.

The first mask may be rotatable between its first position and its second position, said drive means being configured such that:

- rotating the first mask from its first position to its second position in a first direction of rotation causes the second mask to move, and
- rotating the first mask from its first position to its second position in a second direction of rotation opposite to the first direction does not cause the second mask to move.

BRIEF DESCRIPTION OF DRAWINGS

These subjects, features and advantages of the present invention will be set forth in detail in the following description of a particular embodiment given by way of non-limiting example in conjunction with the accompanying figures, in which.

DETAILED DESCRIPTION OF THE INVENTION

Figure 1:
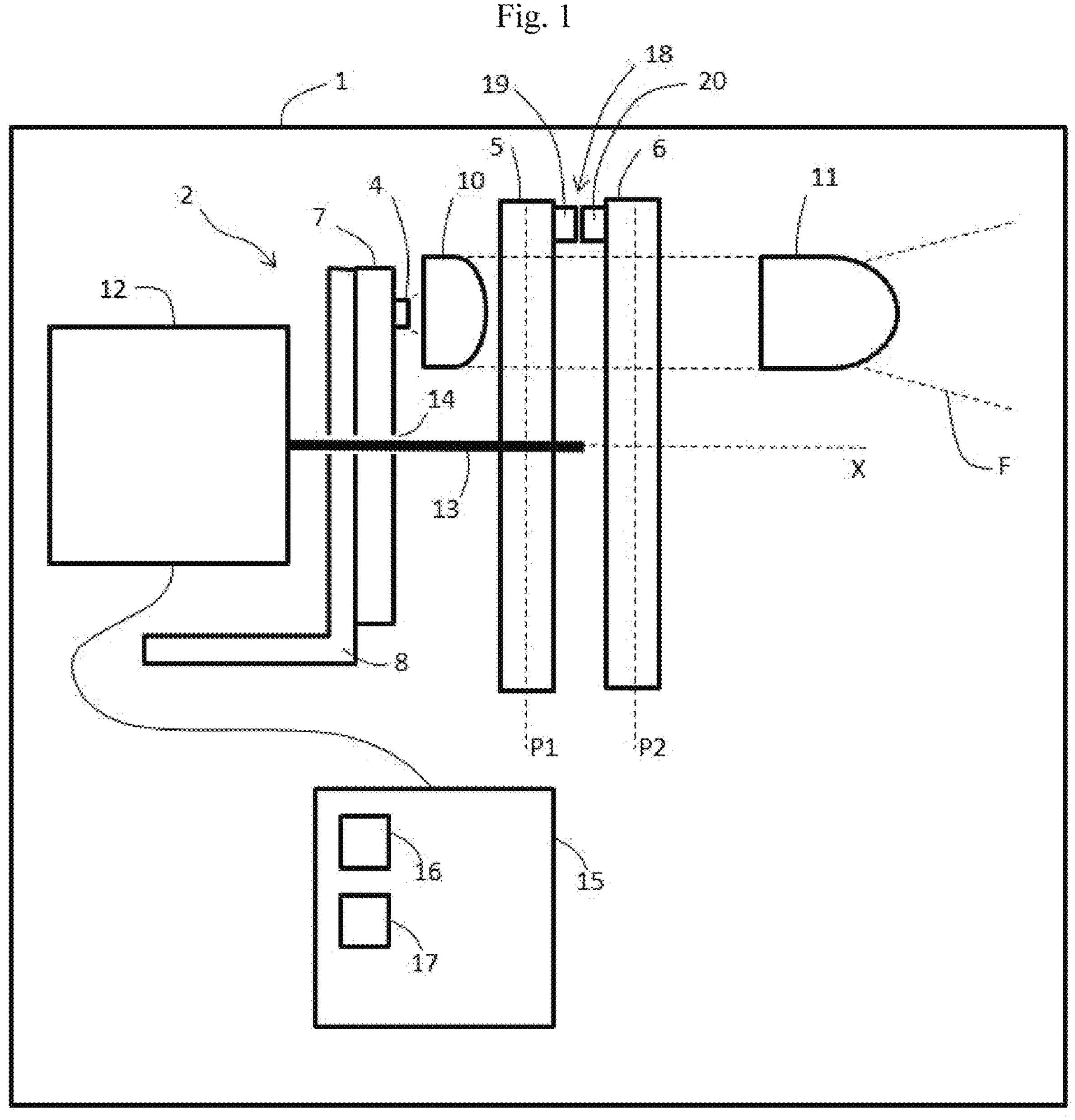
FIG. 1 is a schematic view of an automotive vehicle equipped with a luminous device according to one embodiment of the invention.

FIG. 1 schematically depicts an automotive vehicle 1 according to one embodiment of the invention. The vehicle 1 may be, for example, a passenger vehicle, a utility vehicle, a truck or even a bus. The vehicle 1 comprises a luminous device 2 according to an embodiment of the invention. The luminous device 2 is configured to project an image onto the ground around the vehicle 1. The image may be, for example, projected onto the ground at a few dozen centimeters away along one side of the vehicle. The luminous device 2 may be, for example, attached to the vehicle at an exterior rear-view mirror of the vehicle or at a door sill of the vehicle. The image projected onto the ground may include information on the status of the vehicle and/or on the vehicle's surroundings. Advantageously, the image projected onto the ground takes the form of one or more pictograms.

The luminous device 2 comprises a casing (not shown) housing at least one light source 4 capable of producing a light beam F, a first mask 5 and a second mask 6. The first mask 5 and the second mask 6 are positioned at least partially in the path of the light beam F.

Note that the enumeration adjectives "first", "second", etc. featured in this document do not characterize a relationship of order between the various objects to which they relate, but merely aim to distinguish them from each other.

The light source 4 may be, for example, a light-emitting diode or a set of light-emitting diodes. Alternatively, it could take any other form, such as an incandescent light bulb. Advantageously, the light source may have sufficient power to project an image onto the ground that is visible even in broad daylight. Preferably, the light source 4 may project white light rays. The light source 4 may be connected to a printed circuit board 7. The printed circuit board may be held by a support 8 possibly comprising a heat sink. The luminous device 2 is not intended to produce night-time lighting of the vehicle's surroundings, or to make the vehicle clearly visible to other road users. Thus, the luminous device 2 is distinguished from the headlights which are usually fitted to vehicles and which have high-beam lights and/or low-beam lights.

The luminous device 2 also comprises an optical guide 10 arranged between the light source 4 and a portion of the first mask 5. The optical guide 10 is configured to guide the light rays coming from the light source 4 toward a portion of the first mask 5. Thus, according to the embodiment presented, the luminous device 2 comprises a lighting zone Z1 for illuminating the first mask 5, and only that part of the first mask 5 that is positioned in the lighting zone Z1 contributes to the projection of an image onto the ground. It is also possible to define a lighting zone Z2 for illuminating the second mask 6 as being the projection of the lighting zone Z1 onto the second mask following the path of the light rays. The optical guide 10 may be, for example, a light guide, a collimator, an illumination lens or else any type of optical component capable of collecting and/or of directing light.

The first mask 5 comprises a first pattern and at least one second pattern. The first mask 5 is movable between a first position and at least a second position. In particular, the first mask is movable between as many positions as it has patterns. A distinct pattern of the first mask is positioned through the light beam F, in the lighting zone Z1, for each distinct position of the first mask.

Similarly, the second mask 6 comprises a third pattern and at least one fourth pattern. The second mask 6 is movable between a first position and at least a second position. In particular, the second mask is movable between as many positions as it has patterns. A distinct pattern of the second mask is positioned through the light beam F, in the lighting zone Z2, for each distinct position of the second mask.

The patterns of the first mask 5 and of the second mask 6 are configured to intercept or filter light rays coming from the light source 4 so as to produce images. The image finally projected onto the ground results from the combination of the patterns of the first mask and of the second mask which are positioned through the light beam.

According to a preferred embodiment, the first mask 5 and the second mask 6 are movable in rotation about the same axis X. The first mask has a generally circular shape, the patterns of the first mask being distributed around a center O1 of the first mask, notably in distinct angular sectors of the first mask. Similarly, the second mask has a generally circular shape, the patterns of the second mask being distributed around a center O2 of the second mask, notably in distinct angular sectors of the second mask. Such an embodiment has the advantage that the volume occupied by the first mask and the second mask does not vary as a function of their orientation. The luminous device 2 can therefore remain very compact. The diameter of each mask 5, 6 may for example be between 1 cm and 5 cm inclusive.

The first mask 5 extends in a first plane P1 and the second mask 6 extends in a second plane P2. The plane P1 in which the first mask 5 extends in its first position is identical to the plane in which it extends in its second position. Advantageously, the plane P2 in which the second mask 6 extends in its first position is identical to the plane in which it extends in its second position. The second plane P2 is parallel to the first plane P1 and offset with respect to the first plane. In particular, the first plane P1 and the second plane P2 are perpendicular to the axis X. The second mask is positioned behind the first mask in the direction of propagation of the light rays. Thus, a pattern of the second mask is intended to be superposed with a pattern of the first mask to produce an image resulting from the combination of these two patterns. All or some of the patterns of the second mask can thus be combined with all or some of the patterns of the second mask, so as to produce a large number of different images.

According to various embodiment variants, the first mask and/or the second mask could be movable in a movement other than a rotation, for example movable in translation. The first mask and/or the second mask could be movable in rotation about a point which is not necessarily the center of the first mask and/or of the second mask. The first mask and/or the second mask could be movable in rotation about a point arranged at an edge of the first mask, and/or respectively an edge of the second mask. The first mask and/or the second mask could have a shape other than a circular shape, for example a polygonal shape. The second mask could be positioned in front of the first mask in the direction of propagation of the light rays.

An optical device 11, such as a projection lens or a set of projection lenses, may be provided downstream of the masks 5, 6, i.e. on the other side of the masks 5, 6 from the light source 4, to shape and direct the light beam toward the ground, and/or to correct color effects, and/or to correct image distortion effects and/or to improve sharpness.

To move the first mask 5 between its first position and its second position, the luminous device 2 comprises an actuator 12 mechanically connected to the first mask 5. In particular, the actuator 12 is an electric motor. The electric motor is positioned behind the printed circuit board 7 and behind the support 8. It comprises a rotary shaft 13 passing through an opening 14 made in the printed circuit board 7 and in the support 8. The rotary shaft 13 extends along the axis X and is fixed to the center O1 of the first mask 5.

According to an embodiment variant, the connection between the actuator 12 and the first mask 5 could be arranged differently. For example, the first mask 5 could be rotatably or slidably mounted on a support distinct from the actuator 12. The actuator could be mechanically connected to an edge of the first mask 5. A translational and/or rotational movement of the first mask 5 could be obtained by virtue of the interaction between a toothed wheel rigidly secured to the actuator and a rack rigidly secured to the first mask 5.

The printed circuit board 7 and the actuator 12 are electrically connected to an electronic control unit 15 comprising a memory 16 and a microprocessor 17. The memory 16 of the electronic control unit 15 is a data recording medium on which is recorded a computer program comprising program code instructions for implementing a method for automatically controlling the luminous device 2. The microprocessor 17 is able to execute this computer program. In particular, the electronic control unit 15 is configured to control the switching on or off of the light source 4 and the rotation of the first mask. The electronic control unit 15 can also control the direction of rotation of the first mask.

The second mask 6 is mounted with the freedom to rotate about the axis X. To this end, it can be fixed to an element of the luminous device by means of a bearing, for example a rolling bearing. The luminous device may optionally include a resistance or brake acting on the second mask so that it does not move too easily between its first position and its at least second position, for example under the effect of vibrations of the luminous device.

The luminous device 2 also comprises a drive means 18 configured to optionally move the second mask between its first position and its second position at the same time as the first mask. In other words, the luminous device 2 may be in two particular operating states: in a first operating state, the first mask may be moved freely by the actuator 12, without causing the second mask to move. In a second operating state, moving the first mask automatically causes the second mask to move.

The drive means 18 can be embodied in several ways. According to one embodiment, the drive means comprises a first stop 19 secured to the first mask 5, the first stop 19 being able to come into contact with a second stop 20 secured to the second mask 6. When the first stop 19 comes into contact with the second stop 20, a subsequent movement of the first mask in the direction in which the first stop 19 is bearing against the second stop 20 causes the second mask to move. On the other hand, as long as the first stop 19 is not bearing against the second stop 20, the first mask can be moved freely without causing the second mask to move. The driving or absence of driving of the second mask can thus be easily controlled by adapting the direction in which the first mask 5 is moved. In particular, in the case where the first mask and the second mask are movable in rotation, the choice of the direction of rotation of the first mask between its first position and its second position makes it possible to cause or not to cause the second mask to move.

The first stop 19 and the second stop 20 may, for example, be arranged at an outer periphery of the first mask and of the second mask respectively. The first stop 19 may project from the first mask 5 in the direction of the second mask and/or the second stop 20 may project from the second mask 6 in the direction of the first mask 5. The first mask and/or the second mask may each comprise one or more stops. By using several stops for the same mask, a smaller movement of the first mask may suffice for a stop of the first mask to come into contact with a stop of the second mask. On the other hand, the use of several stops for the same mask may potentially make it impossible to combine certain patterns of the first mask with certain patterns of the second mask.

As a variant or in addition, the drive means 18 may comprise electromagnetic means configured to optionally secure the second mask to the first mask 5 and/or to an element of the actuator 12. For example, the second mask may be movable between an engaged position in which it is secured to the first mask or to an element of the actuator and a disengaged position in which it is secured neither to the first mask nor to an element of the actuator. For example, the second mask 6 may be movable in translation parallel to the axis X between its disengaged position and its engaged position. In the engaged position, stop means, friction surfaces or else magnetized elements of the second mask can cooperate with conjugate means arranged on the first mask 5 or on the rotary shaft 13, so as to enable the second mask to be driven. In the disengaged position, these stop means, friction surfaces or magnetized elements no longer cooperate with the conjugate means of the first mask or of the rotary shaft, so as to allow the first mask to rotate freely without driving the second mask. Alternatively, it is the first mask which could be movable between a disengaged position and an engaged position.

Figure 2:
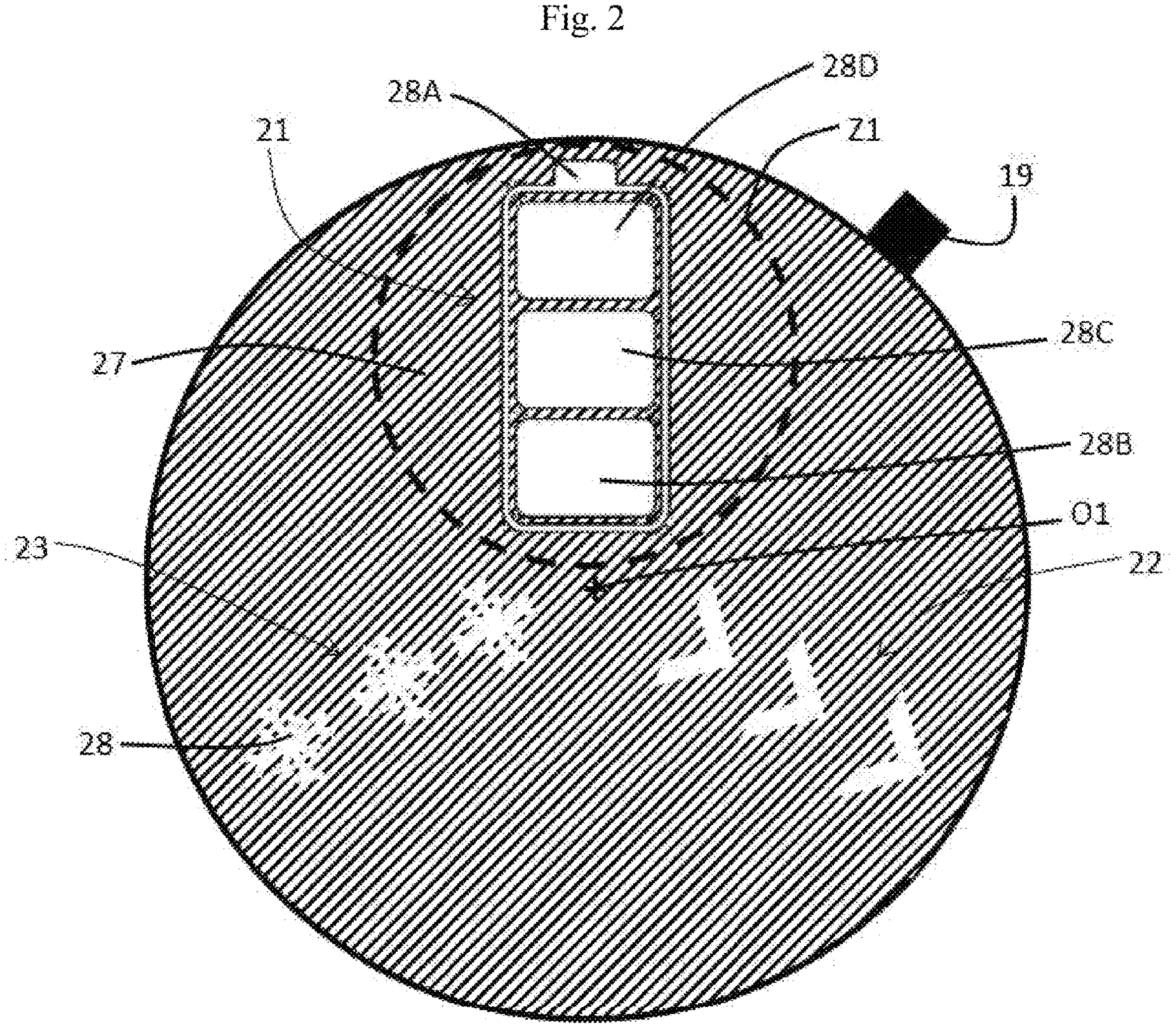
FIG. 2 is a schematic view of a first mask of the luminous device.

FIG. 2 illustrates an embodiment of the first mask 5. According to the embodiment shown, the first mask comprises three patterns 21, 22, 23 which when illuminated by the light source make it possible to project three distinct images onto the ground. The patterns 21, 22, 23 are distributed around the center O1. The patterns are distributed so that only one pattern at a time can be found in the lighting zone Z1. It will be noted that the lighting zone Z1 has a circular shape. As a variant, the lighting zone could have any other shape, such as for example a generally polygonal shape, in particular a generally trapezoidal or pseudo-trapezoidal shape, the optical guide 10 then being adapted accordingly. The number of patterns appearing on the first mask could be different, for example two patterns, four patterns, five patterns or even any number greater than or equal to six.

According to one embodiment, the patterns 21, 22, 23 each comprise opaque zones 27 and transparent zones 28. The opaque zones 27 (shown as a hatched area in FIG. 2) are zones blocking or reflecting the light rays coming from the light source 4. They may be, for example, black in color or chrome-plated. The transparent zones 28 are zones allowing the light rays coming from the light source 4 to pass through. The opaque zones 27 and the transparent zones 28 are complementary zones of the surface of the first mask 5. For example, the first mask 5 may comprise a transparent support, for example made of glass, locally covered by an occulting substrate deposited by lithography. Lithography advantageously makes it possible to obtain high geometric precision in the transparent zones and opaque zones. Alternatively, other methods could be envisaged, such as cutting openings in a support made of opaque material, in particular by laser cutting. According to an embodiment variant, the patterns 21, 22, 23 could comprise translucent zones in such a way as to produce an image projected onto the ground comprising portions that are more strongly or weakly illuminated. The first mask could also include colored filters to produce color images.

The transparent zones 28 have shapes, in particular contours, suitable for the projection onto the ground of images representing a pictogram. The contours of each transparent zone 28 are therefore linked to the contours of the pictogram. In practice, the shape of the transparent zones 28 may be adapted to take into account the geometric deformations linked to the projection of the light beam onto the ground, in particular to take into account the angle of incidence of the light rays on the ground. The pattern 21 may have the shape of a battery cell comprising three stages, each stage representing a level of charge of the battery. In particular, the pattern 21 comprises four distinct transparent zones 28A, 28B, 28C and 28D. The four transparent zones 28A, 28B, 28C and 28D are separated from one another by opaque zones 27. In this case, the transparent zone 28A represents a contour of the shape of the battery cell and the transparent zones 28B, 28C and 28D each represent a level of the battery cell. The pattern 22 may comprise three symbols in the form of an arrow and the pattern 23 may comprise three symbols in the form of a snowflake. As a variant, any other geometric shape, symbol or pictogram could be envisaged. The largest dimension of a transparent zone 28 may for example be between 1 mm and 10 mm inclusive. The pictogram projected onto the ground preferably has a simple geometric shape. The image projected by the luminous device is non-pixelated.

Figures 3, 4:
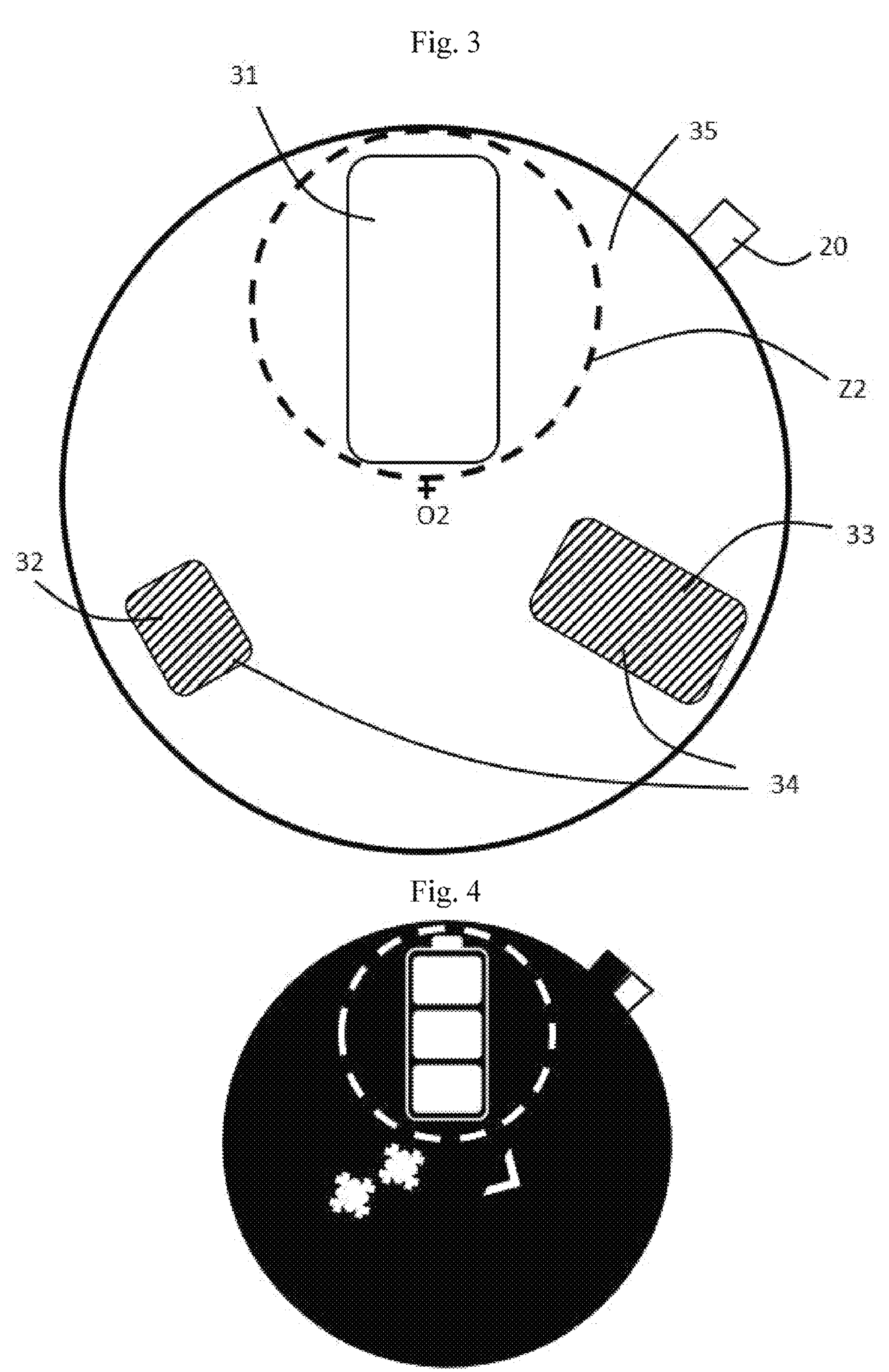
FIG. 3 is a schematic view of a second mask of the luminous device.
FIG. 4 is a schematic view of the superposition of the first mask and of the second mask in a first configuration.

FIG. 3 illustrates an embodiment of the second mask 6. As for the first mask, the second mask comprises three portions intended to extend through the light beam F according to the position of the second mask. Each portion comprises a distinct pattern 31, 31, 33. The patterns 31, 31, 33 are distributed around the center O2. The patterns are distributed so that only one pattern at a time can be found in the lighting zone Z2. The number of patterns appearing on the second mask could be different, for example two patterns, four patterns, five patterns or even any number greater than or equal to six.

The patterns 31, 32, 33 each comprise opaque zones 34 and/or transparent zones 35. The opaque zones 34 and the transparent zones 35 are complementary zones of the surface of the second mask 6. The pattern 31 comprises only a transparent zone. The pattern 31 therefore does not block any light ray of the light beam passing through it. The pattern 31 therefore makes it possible to project onto the ground an image which results solely from the shape of the pattern of the first mask located in the lighting zone Z1.

The patterns 32 and 33 are intended to locally mask transparent zones of the patterns 21, 22 and 23 so as to locally modify the image projected onto the ground. The pattern 32 comprises an opaque zone of rectangular shape. The size of the opaque zone of the pattern 32 is suitable for positioning itself face-to-face with the transparent zone 28D and thus for masking a stage of the pattern 21 and/or one of the three symbols of the pattern 22 or of the pattern 23. Advantageously, the opaque zone 34 of the pattern 32 has a shape substantially homothetic to the shape of the transparent zone 28D of the pattern 21. This makes it possible to occult only the transparent zone 28D without masking the other transparent zones 28A, 28B and 28C. The transparent zone 35 of the pattern 32 extends face-to-face with the transparent zones 28A, 28B and 28C when the pattern 21 is in the lighting zone Z1 and the pattern 32 is in the lighting zone Z2. Thus, the transparent zones 28A, 28B and 28C are not occulted. It is thus possible to eliminate an element forming the pictogram projected onto the ground without modifying or negatively affecting the appearance of the other elements of the pictogram. Note that, in the event that the light beam coming from the first mask is diverging or converging, it is possible to provide shapes of the opaque zone 34 of the second mask which are not identical, but are more generally homothetic, to the shapes of the transparent zones of the first mask. As will be seen below, the opaque zones 34 of the patterns of the second mask may also be provided with larger dimensions than the transparent zones of the first mask which they are intended to cover, so as to make an allowance for offsets in terms of positioning between the first mask and the second mask.

The pattern 33 comprises an opaque zone of rectangular shape and of greater dimension than the opaque zone of the pattern 32. The size of the opaque zone of the pattern 33 is suitable for being positioned face-to-face with the transparent zones 28C and 28D, and thus for masking two stages of the pattern 21 and/or two of the three symbols of the pattern 22 or of the pattern 23.

By means of the drive means 18, the second mask 6 can be moved so that one of its patterns 31, 32, 33 is located through the light beam F, that is to say in the lighting zone Z2. The pattern 31 makes it possible to keep unchanged the image resulting from the first mask. The patterns 32 and 33 make it possible to mask larger or smaller parts of the images resulting from the first mask.

FIGS. 4 to 12 illustrate nine possible configurations of the first mask and of the second mask. FIG. 4 illustrates a first configuration in which the first mask 5 and the second mask 6 are positioned so that the patterns 21 and 31 are located through the light beam, that is to say in the lighting zones Z1 and Z2 respectively. In this configuration, the first stop 19 is bearing against the second stop 20. When the light source 4 emits a light beam, the latter is guided by the optical guide 10 and illuminates the first mask 5 in the lighting zone Z1. The light rays incident at the opaque zones 27 of the first mask are reflected or absorbed. The light rays incident at the transparent zones 28A, 28, 28C, 28D of the first mask pass through the first mask and reach the second mask. Since the first pattern 31 of the second mask has no opaque zone, all the light rays incident on the second mask 6 pass through it. The light rays are then guided toward the ground by the optical device 11. The resulting image shows a pictogram of a battery cell with all three stages full, as illustrated in FIG. 13. Such a pictogram indicates that the vehicle battery is fully charged.

Figure 5:
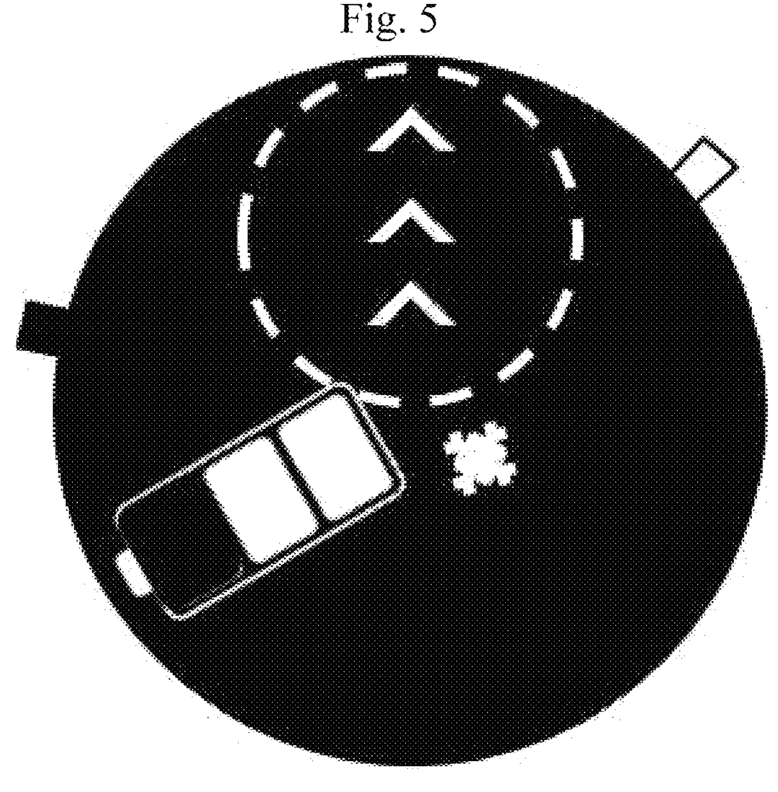
FIG. 5 is a schematic view of the superposition of the first mask and of the second mask in a second configuration.
Figure 6:
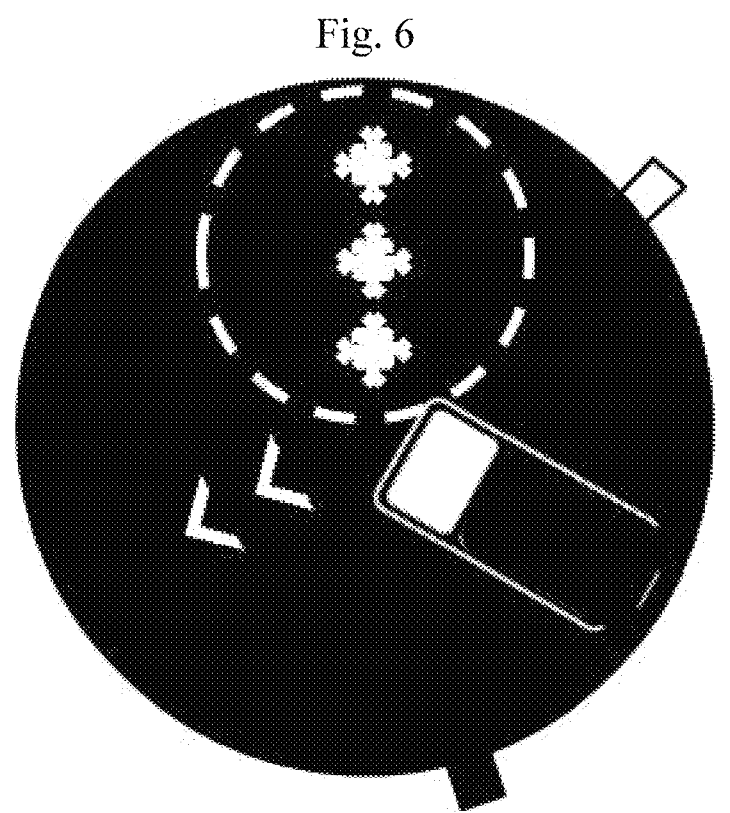
FIG. 6 is a schematic view of the superposition of the first mask and of the second mask in a third configuration.

Starting from the first configuration, the actuator 12 can be controlled by the electronic control unit to cause the first mask 5 to pivot in a first direction of rotation (corresponding to the clockwise direction in the figures) or, on the contrary, in a second direction (corresponding to the counterclockwise direction). With reference to FIG. 5, if the first mask 5 pivots by a third of a turn in the counterclockwise direction, then the first stop 19 moves away from the second stop 20 and the rotation of the first mask does not cause any rotation of the second mask. Such a rotation brings the pattern 22 of the first mask into the lighting zone Z1. The pattern 31 of the second mask remains in position in the lighting zone Z2. An image comprising three arrow-shaped symbols is thus projected onto the ground. A further rotation of the first mask by a third of a turn in the counterclockwise direction causes the luminous device to pass from the configuration of FIG. 5 to the configuration of FIG. 6. The pattern 23 of the first mask is in the lighting zone Z1 and the pattern 31 of the second mask remains in position in the lighting zone Z2. An image comprising three snowflake-shaped symbols is thus projected onto the ground.

Starting from the configuration of FIG. 4, the first mask can also be controlled by the actuator so as to rotate through a third of a turn in the clockwise direction. In this case, the first stop 19 bears against the second stop 20 and rotating the first mask causes the second mask to rotate. The luminous device is then in a new configuration illustrated in FIG. 7. The pattern 23 of the first mask is in the lighting zone Z1 and the pattern 32 of the second mask is in the lighting zone Z2. An image comprising two snowflake-shaped symbols is thus projected onto the ground.

Figure 7:
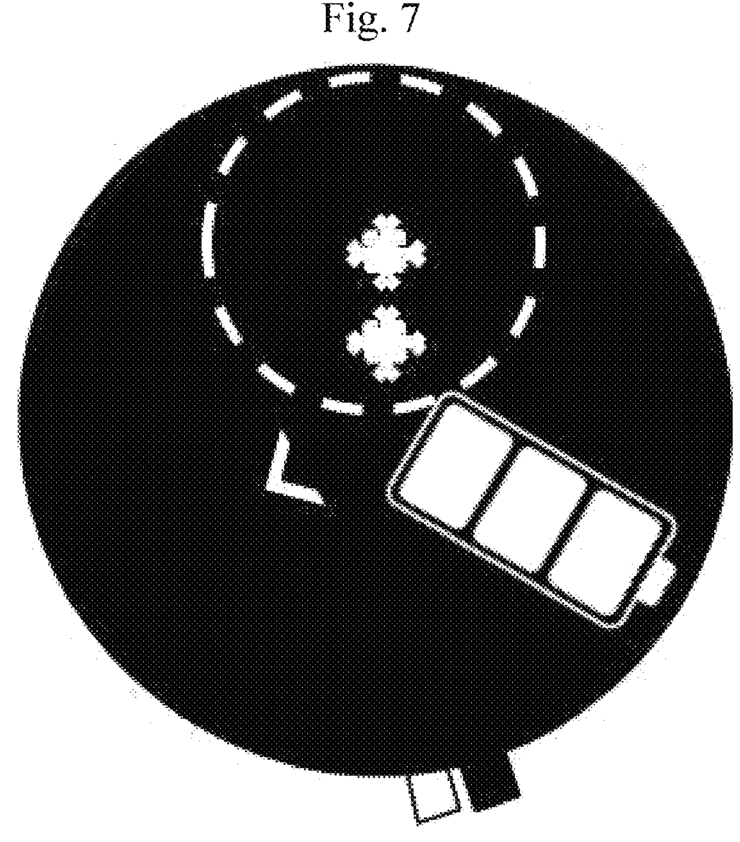
FIG. 7 is a schematic view of the superposition of the first mask and of the second mask in a fourth configuration.
Figure 8:
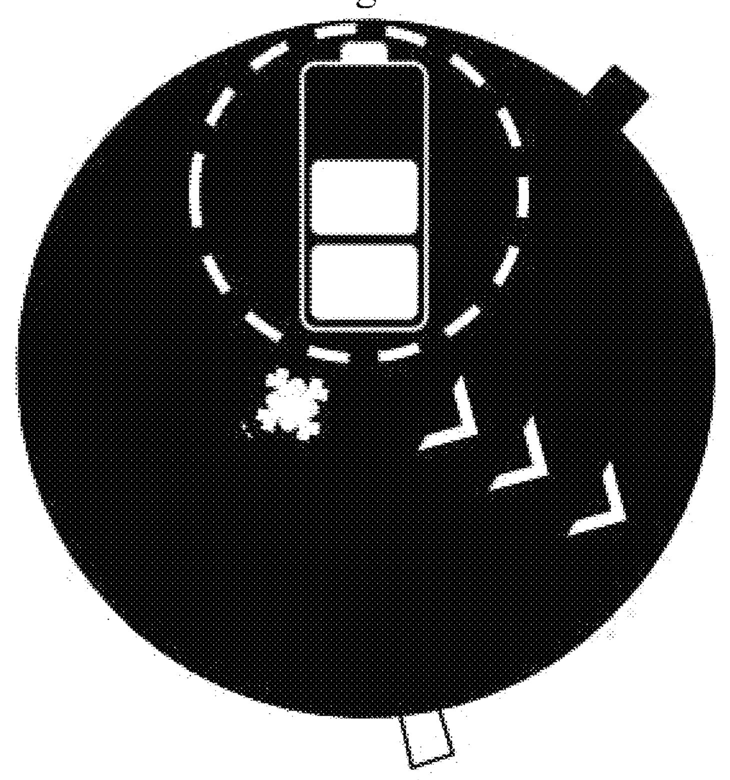
FIG. 8 is a schematic view of the superposition of the first mask and of the second mask in a fifth configuration.
Figure 9:
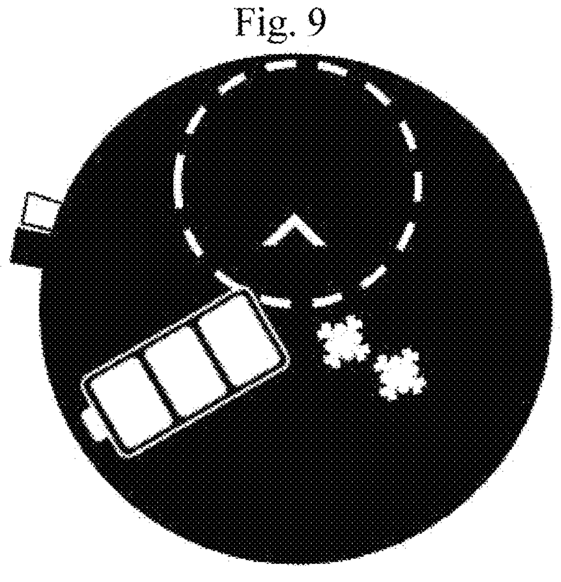
FIG. 9 is a schematic view of the superposition of the first mask and of the second mask in a sixth configuration.
Figure 10:
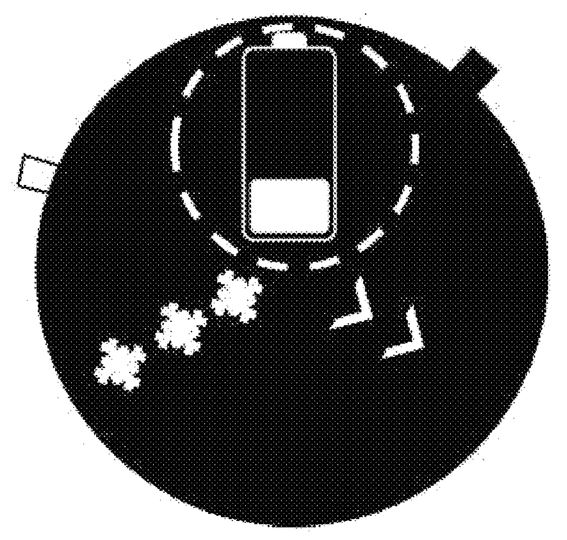
FIG. 10 is a schematic view of the superposition of the first mask and of the second mask in a seventh configuration.
Figure 11:
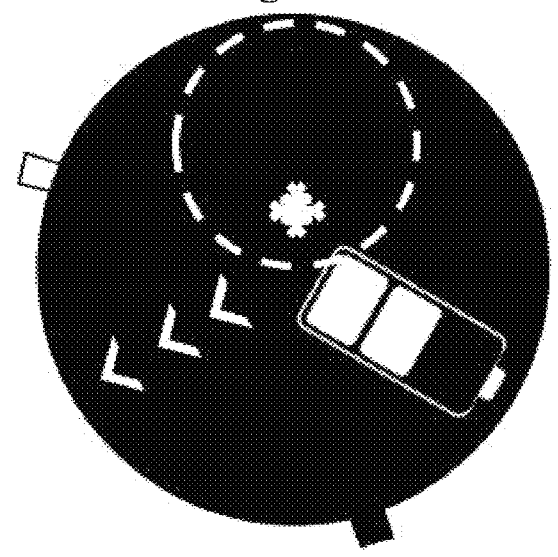
FIG. 11 is a schematic view of the superposition of the first mask and of the second mask in an eighth configuration.
Figures 12, 13:
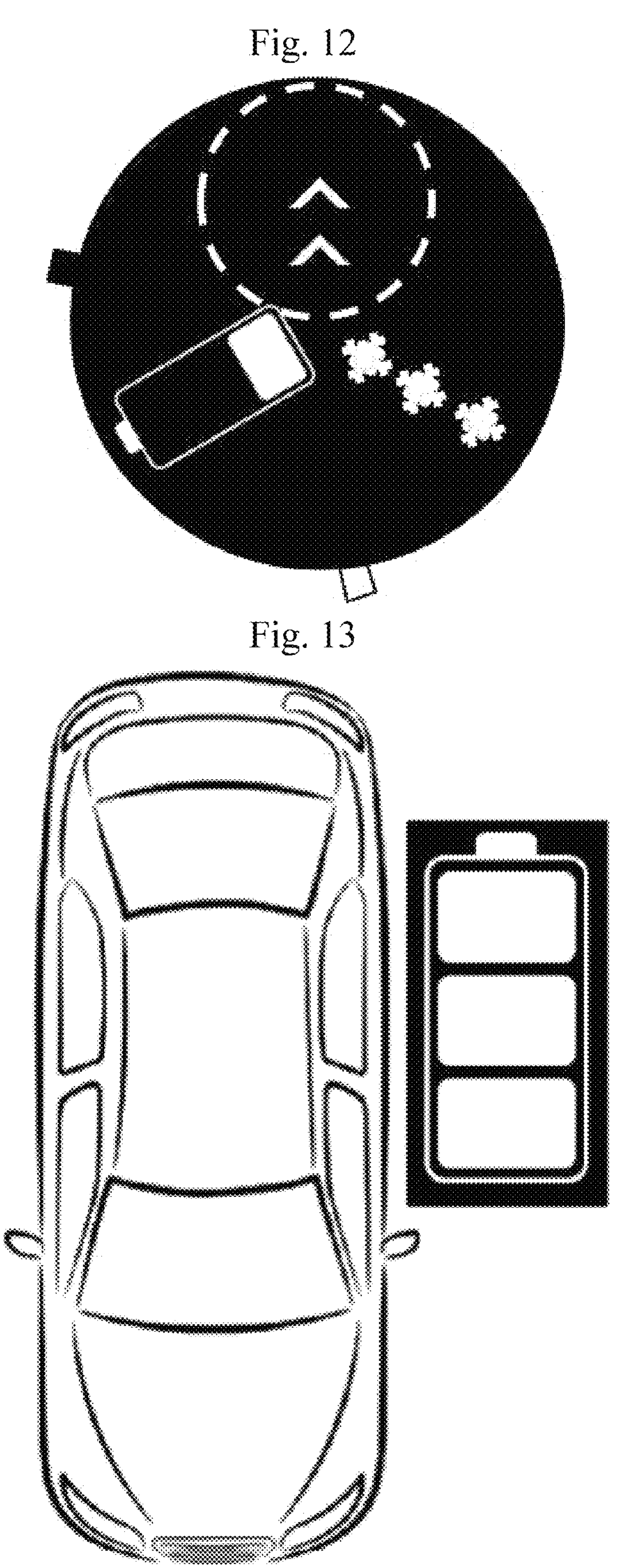
FIG. 12 is a schematic view of the superposition of the first mask and of the second mask in a ninth configuration.
FIG. 13 is a schematic view, from above, of the vehicle and of a first image projected next to the vehicle by the luminous device.
Figure 14:
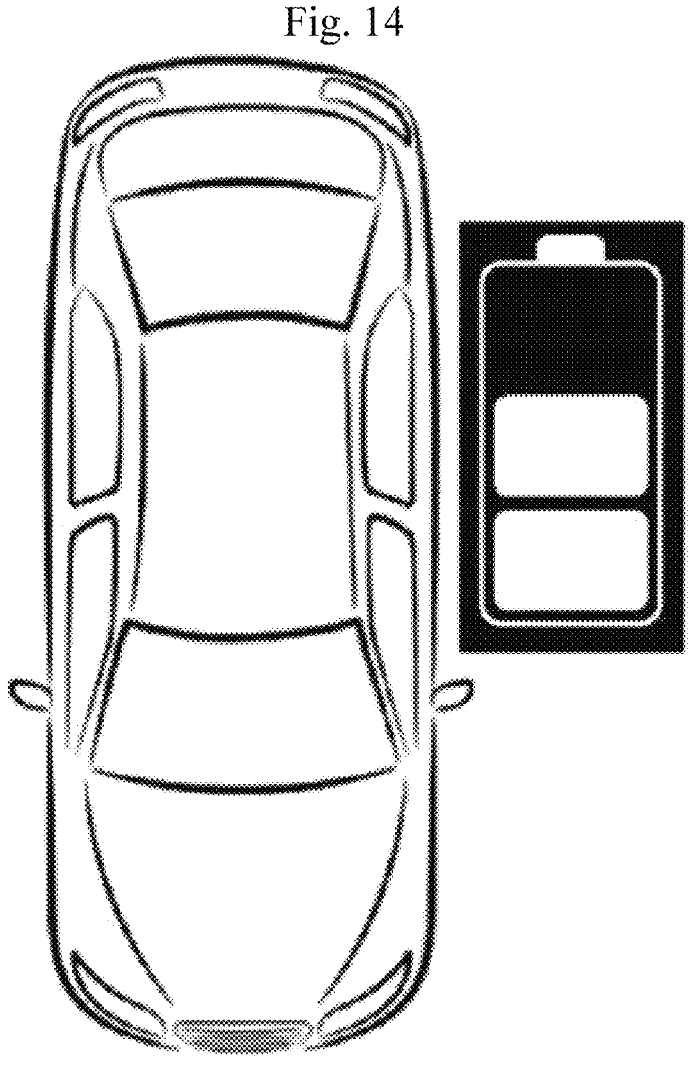
FIG. 14 is a schematic view, from above, of the vehicle and of a second image projected next to the vehicle by the luminous device.

Starting from the configuration of FIG. 7, the first mask can be controlled by the actuator so as to rotate through a third of a turn in the counterclockwise direction. The first stop 19 moves away from the second stop 20 and rotating the first mask does not cause the second mask to rotate. The luminous device is then in a new configuration illustrated in FIG. 8. The pattern 22 of the first mask is in the lighting zone Z1 and the pattern 32 of the second mask is in the lighting zone Z2. The opaque zone 34 of the pattern 32 of the second mask then covers the transparent zone 28D of the pattern 21 of the first mask. As can be seen in FIG. 14, an image representing a battery cell with only two of its three stages illuminated is thus projected onto the ground. Such a pictogram indicates that the vehicle battery is two-thirds charged.

Figure 15:
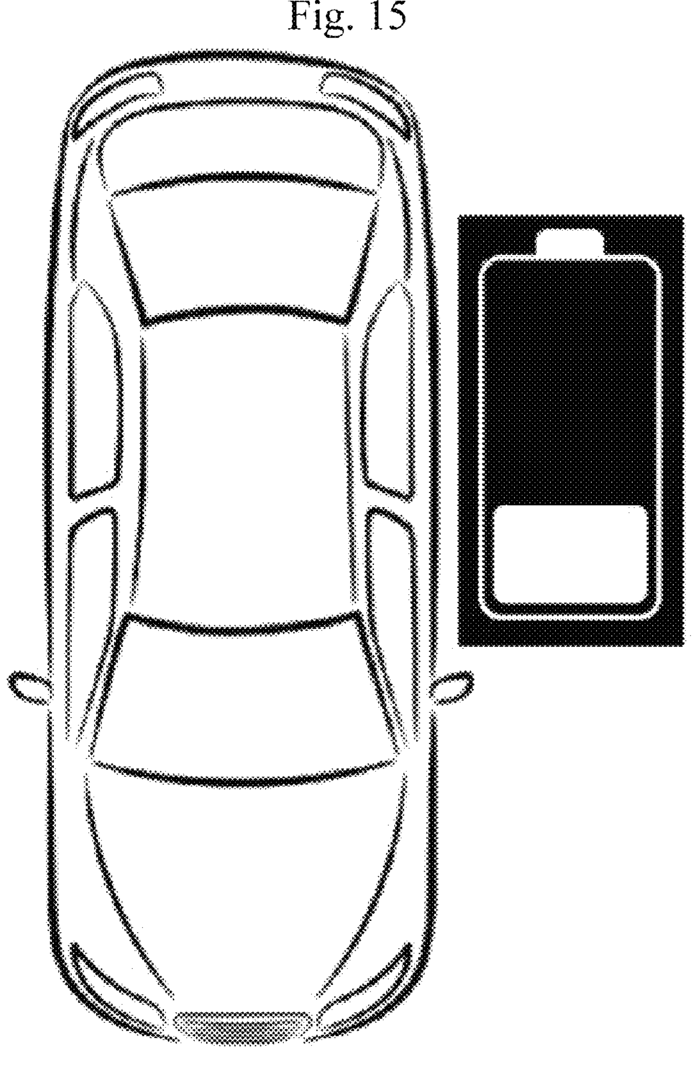
FIG. 15 is a schematic view, from above, of the vehicle and of a third image projected next to the vehicle by the luminous device.

Conversely, starting from the configuration of FIG. 7, the first mask can be controlled by the actuator so as to rotate through a further third of a turn in the clockwise direction. The first stop 19 bears against the second stop 20 and rotating the first mask causes the second mask to rotate. The luminous device is then in a new configuration illustrated in FIG. 9. The pattern 22 of the first mask is in the lighting zone Z1 and the pattern 33 of the second mask is in the lighting zone Z2. The opaque zone 34 of the pattern 33 of the second mask then covers two of the three symbols of the pattern 22. An image comprising a single arrow-shaped symbol is thus projected onto the ground. Starting from the configuration of FIG. 9, rotating the first mask by a third of a turn or by two thirds of a turn in the counterclockwise direction makes it possible to obtain the configurations of FIGS. 10 and 11, respectively. The configuration of FIG. 10 results in the projection onto the ground of an image representing a battery cell with a single stage illuminated, as visible in FIG. 15. The configuration of FIG. 12 can be obtained starting from the configuration of FIG. 8 by pivoting the first mask by one third of a turn in the counterclockwise direction.

Finally, the invention therefore proposes to project images onto the ground by superimposing two patterns belonging to two distinct masks. Advantageously, each of the patterns of the first mask can be combined with each of the patterns of the second mask so as to produce a different image. The invention thus makes it possible to obtain a large number of different images from a limited number of patterns. According to the embodiment shown, the first mask and the second mask each comprise three patterns. As a variant, this number could be different. The number of patterns featured on the first mask is not necessarily equal to the number of patterns featured on the second mask. If N designates the number of patterns present on the first mask and P designates the number of patterns present on the second mask, the number of different images can thus be as high as $N \times P$.

Note that the patterns 21, 22, 23 are advantageously formed by a plurality of transparent zones separated from one another by opaque zones. The luminous device 2 thus tolerates a certain degree of inaccuracy in the relative positionings of the first mask 5 and the second mask 6. To be specific, the opaque zones 34 of the second mask may be offset slightly relative to the transparent zones of the first mask, which they cover, with the provisos both that the opaque zones of the second mask are both large enough to cover the transparent zones of the first mask despite the offset, and that they are not so large that they protrude into another transparent zone of the first mask. Thus, the wider the opaque zones 27 separating the different transparent zones of the first mask, the more the luminous device will be able to tolerate significant positioning offsets between the first mask and the second mask without adversely affecting the quality of the image projected onto the ground.

Advantageously, the stops 19 and 20 make it possible to obtain very good positioning of the second mask relative to the first mask when these stops are bearing against each other. It is therefore possible to obtain very precise positioning of the masks for certain configurations independently of the precision of the actuator 12. In particular, according to the embodiment shown, the configurations of FIGS. 4, 7 and 9 benefit from this particularly precise relative positioning. It is therefore possible to envisage for these configurations a superposition of patterns requiring greater precision.

By virtue of the invention, it is thus possible to offer a luminous device in which the masks comprise fewer patterns on their surface while still having a significant number of different images. Since each mask comprises fewer patterns, each pattern may be larger, thereby improving the resolution of the projected image.

The light source may optionally be turned off while the first mask is being moved, so as to mask the transition between the projected images. Regardless of the initial configuration, a new configuration can be obtained by rotating the first mask in one direction and then in another. Advantageously, the memory 16 of the electronic control unit 15 may comprise a series of instructions making it possible to attain any configuration of the luminous device 2 starting from any other configuration. It is thus possible to control the position of the first mask 5 and of the second mask 6 with a single actuator.

Note that, according to the embodiment illustrated, the luminous device comprises two masks 5, 6. As a variant, the number of masks of the luminous device could be any number greater than or equal to two, for example three masks, four masks, or even more masks. For example, the luminous device could include a third mask comprising a fifth pattern and at least a sixth pattern, the third mask being movable between a first position and at least a second position, the fifth pattern being positioned through the light beam when the third mask is in its first position, and the sixth pattern being positioned through the light beam when the third mask is in its second position. The luminous device could then comprise a first drive means configured to optionally move the second mask between its first position and its second position at the same time as the first mask, and a second drive means configured to optionally move the third mask between its first position and its second position at the same time as the first mask and/or at the same time as the second mask.

What is claimed is:

1. A luminous device for projecting an image onto the ground around an automotive vehicle, the luminous device comprising:

- a light source capable of producing a light beam,
- a first mask including a first pattern and at least one second pattern, the first mask being movable between a first position and at least a second position, the first pattern being positioned through the light beam when the first mask is in the first position, the second pattern being positioned through the light beam when the first mask is in the second position,
- a second mask including a third pattern and at least one fourth pattern, the second mask being movable between a third position and at least a fourth position, the third pattern being positioned through the light beam when the second mask is in the third position, the fourth pattern being positioned through the light beam when the second mask is in the fourth position,
- an actuator configured to move the first mask between the first position and at least the second position,
- a drive means configured to optionally move the second mask between the third position and at least the fourth position at the same time as the first mask, wherein the first pattern and/or the second pattern includes at least one opaque zone, a first transparent zone and at least one second transparent zone, the second transparent zone being separated from the first transparent zone by the opaque zone of the first mask, the third pattern and/or the fourth pattern includes a transparent zone and an opaque zone, the transparent zone of the third pattern and/or of the fourth pattern being able to extend face-to-face with the first transparent zone of the first pattern and/or of the second pattern, and the opaque zone of the third pattern and/or of the fourth pattern being able to extend face-to-face with the second transparent zone of the first pattern and/or of the second pattern.

2. The luminous device as claimed in claim 1, wherein the first mask and the second mask are movable in rotation about the same axis.

3. The luminous device as claimed in claim 1, wherein the first mask has a generally circular shape, the patterns of the first mask being distributed around a center of the first mask, and/or in that the second mask has a generally circular shape, the patterns of the second mask being distributed around a center of the second mask.

4. The luminous device as claimed in claim 1, wherein the first mask extends in a first plane and in that the second mask extends in a second plane, the second plane being parallel to the first plane and offset from the first plane.

5. The luminous device as claimed in claim 1, wherein the third pattern and/or the fourth pattern includes at least one opaque zone having a shape substantially homothetic to the shape of the at least one transparent zone of the first pattern and/or of the second pattern, the opaque zone of the third pattern and/or of the fourth pattern being capable of extending face-to-face with the at least one transparent zone of the first pattern and/or of the second pattern.

6. The luminous device as claimed in claim 1, wherein the drive means includes a first stop secured to the first mask, the first stop cooperating with a second stop secured to the second mask, in such a way that the movement of the first mask causes the second mask to move when the first stop is in abutment against the second stop.

7. The luminous device as claimed in claim 1, wherein the drive means includes electromagnetic means configured to optionally secure the second mask to the first mask and/or to an element of the actuator.

8. The luminous device as claimed in claim 1, wherein the first mask is rotatable between the first position and the second position, the drive means being configured such that:

- rotating the first mask from the first position to the second position in a first direction of rotation causes the second mask to move, and
- rotating the first mask from the first position to the second position in a second direction of rotation opposite to the first direction does not cause the second mask to move.

* * * * *